United States Patent [19]
Yang

[11] Patent Number: 6,133,847
[45] Date of Patent: *Oct. 17, 2000

[54] CONFIGURABLE REMOTE CONTROL DEVICE

[75] Inventor: Ping-Fai Yang, Chatham, N.J.

[73] Assignee: AT&T Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/947,662

[22] Filed: Oct. 9, 1997

[51] Int. Cl.$^7$ ................................................... G05B 19/02
[52] U.S. Cl. ................................ 340/825.22; 340/825.72; 348/173; 348/176
[58] Field of Search ..................... 340/825.22, 825.69, 340/825.72; 348/173, 176, 175, 734; 359/142; 379/102; 370/447

[56] References Cited

U.S. PATENT DOCUMENTS

| | | | |
|---|---|---|---|
| 4,728,949 | 3/1988 | Platte et al. | 340/825.37 |
| 4,959,810 | 9/1990 | Darbee et al. | 364/900 |
| 5,410,326 | 4/1995 | Goldstein | 348/734 |
| 5,774,063 | 6/1998 | Berry et al. | 340/825.69 |
| 5,959,539 | 9/1999 | Adolph et al. | 340/825.07 |

*Primary Examiner*—Michael Horabik
*Assistant Examiner*—Anthony A. Asongwed
*Attorney, Agent, or Firm*—Kenyon & Kenyon

[57] ABSTRACT

A remote control device is provided that is able to be programmed after initial manufacture to accommodate the control of additional apparatuses. The remote control device includes a multi-functional, interchangeable user interface where the interface is modified such that it is able to control the functions of a variety of different types of apparatuses.

21 Claims, 4 Drawing Sheets

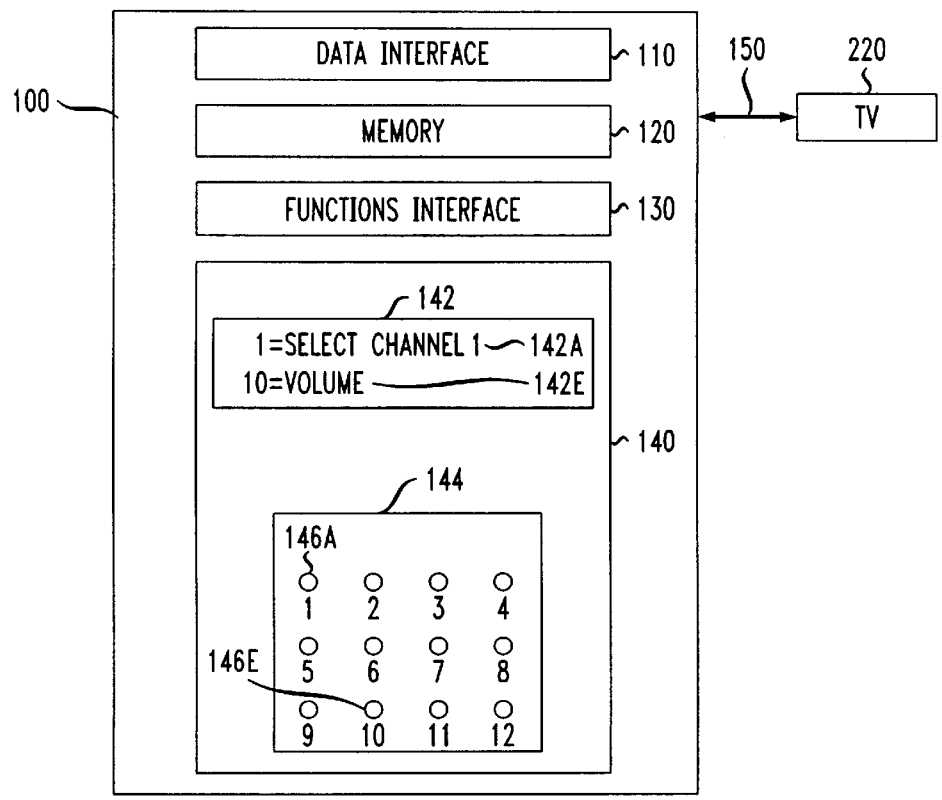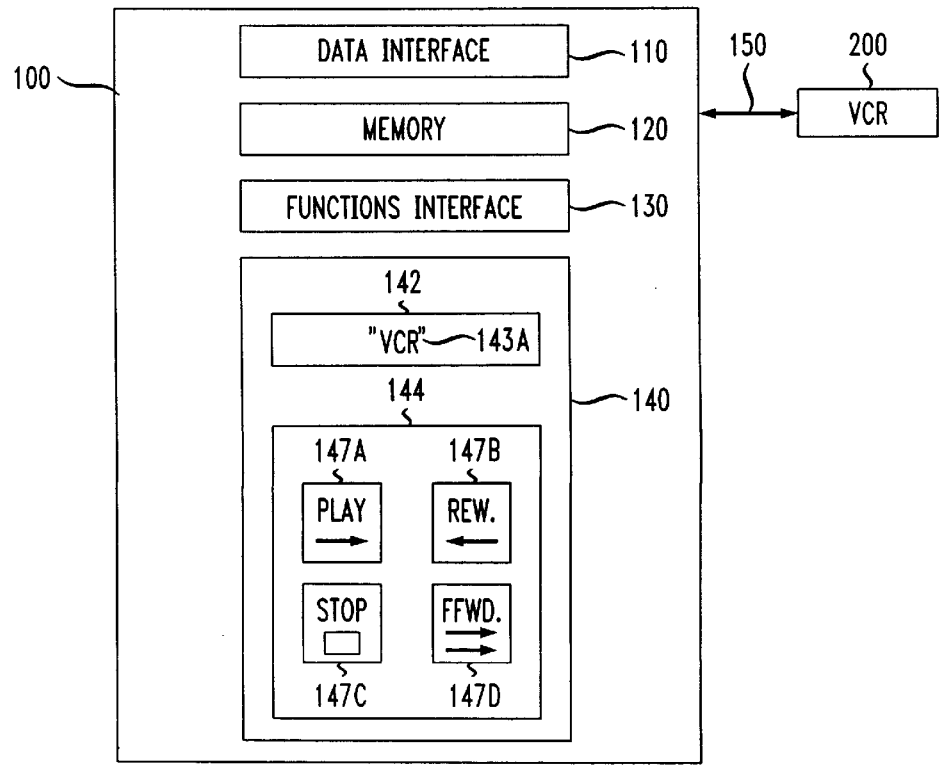

CONFIGURABLE REMOTE CONTROL DEVICE

BACKGROUND OF THE INVENTION

The present invention relates to a remote control device for controlling a multi-function apparatus. More specifically, the invention provides a remote control device that is able to be configured after manufacture such that the device is able to control a variety of different apparatuses. The remote control device will change its user interface based upon the particular apparatus it is controlling.

Currently, remote control devices for controlling electronic apparatuses are known. Remote controls for televisions, VCRs, and stereo systems are available. Additionally, universal remote control devices are available. These universal remote control devices consist of a single device that is able to control a variety of the same type of apparatus or is able to control different types of apparatuses. For example, a single remote control device can be designed to control a variety of televisions that are manufactured by different manufacturers. The user merely enters a pre-programmed code into the remote control device to configure the control device such that it is able to control that particular type of television.

With universal remote control devices that are able to control different types of apparatuses, the remote control device contains pre-programmed software that is utilized to control the various different apparatuses that are to be controlled. Different function keys for each type of apparatus are provided on the remote control device for controlling the various functions of the particular apparatus.

A drawback associated with both of these different embodiments for a universal remote control device, i.e. the device for controlling a variety of the same type of apparatus and the device for controlling different types of apparatuses, is that all of the software required to configure the remote control device to control the particular device that is being operated by the user is programmed into the remote control device at the time of its manufacture. Therefore, the manufacturer must know, at the time of manufacture, the specific apparatuses that the remote control device will operate with and the specific characteristics for these apparatuses. These specific characteristics include the various functions of the apparatuses that are to be controlled and the data link specifications for communicating the control signals to the particular apparatus. The requirement to know the specific apparatuses that the remote control device will operate with and the specific characteristics for these apparatuses at the time of manufacture of the remote control device greatly reduces the "universality" feature of the remote control device.

An additional drawback with the universal remote control device that is capable of controlling a variety of different types of apparatuses is that separate function keys for each different type of apparatus must be provided on the remote control device. For example, if the remote control device is utilized to control a VCR, there is provided on the remote control device separate function keys for the VCR functions, e.g. play, fast forward, etc. If the remote control device is utilized to control a television, separate function keys are provided to control the functions of the television, e.g. channel selector buttons, color quality control buttons, volume, etc. Therefore, in addition to the previously discussed drawback where the different types of apparatuses that the remote control device is to control must be known at the time of manufacture, the additional drawback of having to provide separate function keys for each functionally different type of apparatus that is to be controlled further reduces the flexibility of the remote control device for controlling different apparatuses.

Therefore, it would be desirable to provide a remote control device that is able to be programmed after initial manufacture to accommodate the control of additional apparatuses. Additionally, it would be desirable to provide a universal remote control device that incorporates a multi-functional, interchangeable user interface where the interface is modified such that it is able to control the functions of a variety of different types of apparatuses.

SUMMARY OF THE INVENTION

A configurable remote control device is provided. The remote control device includes a data interface, a functions interface, a memory, and a user interface. The data interface is utilized to download programming software code to the remote control device so that the remote control device is able to control a particular apparatus. The functions interface receives a control signal, either generated by the particular apparatus itself or input by the user, to change the user interface of the remote control device so that the remote control device's user interface is able to control the functions of the particular apparatus that is to be controlled. The user interface provides for the functional control of the particular apparatus. The control signal received by the functions interface is utilized to access the control software from the memory for the particular apparatus that is to be controlled. The control software modifies the user interface so that the user interface is configured to be able to control the various functions of the specific apparatus to be controlled.

In this manner, a configurable remote control device is provided that is able to be programmed after initial manufacture to accommodate the control of additional apparatuses and that incorporates a multi-functional, interchangeable user interface where the interface is modified such that it is able to control the functions of a variety of different types of apparatuses.

BRIEF DESCRIPTION OF THE DRAWINGS

FIG. 2B illustrates the embodiment for the user interface of FIG. 2A as used with a television.

FIG. 3A illustrates a second embodiment for the user interface of the remote control device as used to control a VCR.

DETAILED DESCRIPTION

Figure 1:
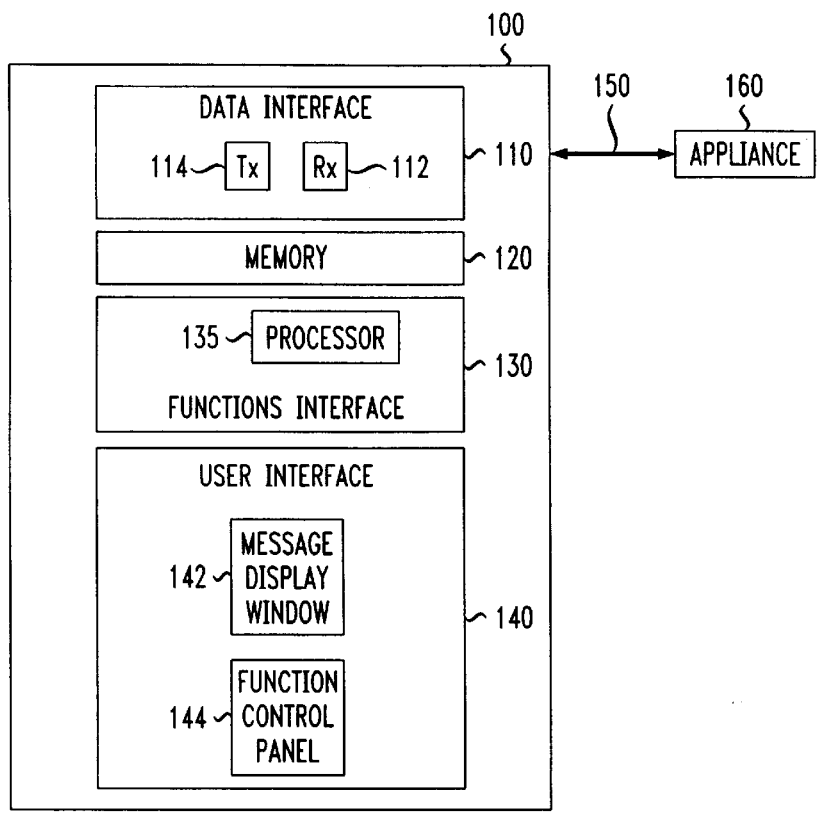
FIG. 1 provides a functional block diagram of the remote control device of the present invention.

FIG. 1 provides a functional block diagram of the remote control device of the present invention. As can be seen, the remote control device 100 contains a data interface 110, a memory 120, functions interface 130, and user interface 140. Also shown in FIG. 1 is an appliance 160 that is controlled by remote control device 100 and a bi-directional data link 150 that is established between the remote control device and the appliance to be controlled.

Data interface 110 is utilized to download programming software code to the remote control device from the particular appliance that is to be controlled. The programming code that is downloaded to the remote control device is that code that is required in order to control the functions of the appliance to be controlled. The downloaded programming code is stored in memory 120 of the remote control device.

As stated previously, data interface 110 downloads programming code from the appliance to be controlled. In FIG. 1, data link 150 is utilized to download the programming code from appliance 160 to remote control device 100. Data link 150 can utilize any type of medium for downloading program code to the remote control. For example, data link 150 can utilize an infrared signal, an RF signal, or can be embodied by utilizing a cable connection between appliance 160 and remote control 100 to transmit the programming code electrically or optically between the appliance and the remote control.

In order to receive the programming code transmitted from appliance 160, data interface 110 includes a receiver 112. Receiver 112 can be any type of receiver as long as it is able to receive the type of transmission (e.g. infrared, RF, etc.) that is sent by appliance 160.

Data interface 110 also includes a transmitter 114. Transmitter 114 transmits the function control signals from remote control device 100 to appliance 160 over data link 150 in order to control the appliance. The function control signals for a particular appliance are generated by the remote control device by utilizing the programming software that is downloaded from the appliance, as was discussed above. Data link 150 is utilized for both downloading programming code from the appliance to the remote control device and for transmitting the function control signals from the remote control device to the appliance. However, the same medium (e.g. infrared, RF, etc.) is not required to be utilized for transmitting all information in both directions. For example, a cable could be utilized for electrically downloading programming code to the remote control device and an RF link could be utilized to transmit function control signals from the remote control to the appliance.

Data interface 110, in addition to receiving the downloaded programming software code from the appliance, also receives an interface control signal from the appliance over data link 150. Because remote control 100 has the capability to control various appliances, and has programming code for controlling all of these appliances stored in memory 120 of the remote control device, the remote control device must know which appliance it is to control and, therefore, which software programming code to retrieve from memory 120 in order to control that particular appliance. In order to allow the remote control device to access the appropriate programming code from memory to control the particular appliance to be controlled, an interface control signal is transmitted from the appliance to the remote control device. The remote control device utilizes this control signal to access the appropriate software code from memory in order to configure user interface 140 so that it is able to control that particular appliance. A complete description of user interface 140 will be provided later in this specification.

As discussed above, in order to control a particular appliance 160 with remote control device 100, a bidirectional data link 150 is established between appliance 160 and remote control device 100 to download software programming code to the remote control, transmit an interface control signal to the remote control, and to transmit function control signals from the remote control to the appliance.

Functions interface 130, in remote control 100, receives the interface control signal from data interface 110 that is transmitted from appliance 160. Functions interface 130 includes processor 135. Based on the particular interface control signal that is received from the particular apparatus, functions interface 130 will utilize that interface control signal to access the control software from memory 120 in order to configure user interface 140 to control that particular apparatus.

User interface 140 is illustrated in FIG. 1 and includes a message display window 142 and a function control panel 144. Message display window 142 provides information to the user related to utilizing the remote control device to control a particular appliance. A more detailed description of message display window 142 will be provided later in this specification. Function control panel 144 is that part of user interface 140 that is utilized by the user to control the functions of the particular appliance that is to be controlled.

Figure 2A:
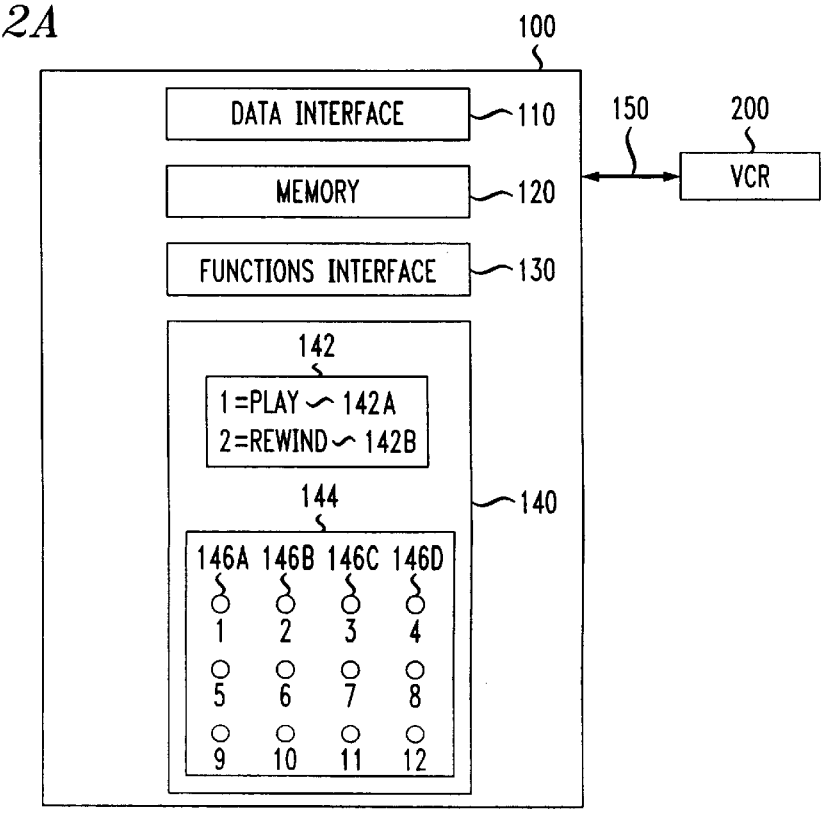
FIG. 2A illustrates one embodiment for the user interface of the remote control device for operation with a VCR.

One embodiment for user interface 140 is shown in FIGS. 2A and 2B. In this embodiment, function control panel 144 consists of a plurality of physical function control buttons, some of which are illustrated and numbered as 146A–D. Each button is utilized to control a particular function of the appliance to be controlled, which in the embodiment of FIG. 2A is a VCR 200. In utilizing the embodiment of FIG. 2A for the user interface 140, VCR 200 would download programming software to remote control device 100 that would be utilized by the remote control device to control the functions of the VCR. The programming software is downloaded to remote control device 100 over data link 150. Data interface 110 would receive the downloaded programming software and store the software in memory 120.

It should be noted that the programming software is only required to be downloaded to the remote control device one time and does not need to be downloaded each time the remote control device is to control the particular appliance. After the programming software is downloaded to the remote control device, the software is stored in memory 120, where it can be accessed to control the particular appliance by utilizing the interface control signal.

In continuing with the description of the embodiment of FIG. 2A, after remote control device 100 stores the programming code for controlling VCR 200 in memory 120, VCR 200 would transmit an interface control signal, as described earlier, to the remote control over data link 150. The interface control signal is received by data interface 110 and sent to functions interface 130. Functions interface 130 utilizes the interface control signal to access the programming software for controlling the VCR from memory 120 and to configure user interface 140 to be able to control the functions of VCR 200.

By utilizing the programming code to configure function control panel 144, each function control button is programmed to control a particular function of the VCR. As such, for example, function control button 146A is configured to control the "play" feature of VCR 200. Therefore, if the user presses button 146A, the remote control device will send a function control signal to VCR 200 over data link 150 to operate the "play" function for the VCR. Similarly, as illustrated in FIG. 2A, function control button 146B has been configured to control the "rewind" function of the VCR. Therefore, if the user presses button 146B, a function control signal will be transmitted to VCR 200 over data link 150 to control the "rewind" function of the VCR. The other function control buttons illustrated in FIG. 2A would be configured in the same manner for controlling other functions of the VCR.

In the embodiment of FIG. 2A, message display window 142 provides information to the user related to the functions that each of the function control buttons control. For example, message 142A provides information to the user that function control button 146A controls the "play" function of the VCR. In the same manner, message 142B provides information that button 146B controls the "rewind" function of the VCR. The message display window can be an LCD display and could be scrolled by the user to provide information on all of the various function control buttons. The operation of the message control window is controlled by the programming software for the particular appliance that is to be controlled.

An additional function performed by message display window 142 of user interface 140 is to provide information to the user as to what particular appliance the remote control is currently configured to control. This function has particular utility where multiple appliances may be present in a room and where the remote control is capable of controlling several of the appliances. To perform this function, the message display window would display the message "VCR" if configured to control the VCR as illustrated in FIG. 2A. Again, this function is performed by user interface 140 by utilizing the programming software for the particular apparatus to be controlled.

FIG. 2B illustrates the same embodiment for user interface 140 as was discussed in FIG. 2A, however, now the user interface is configured to control TV 220. In the same manner as previously disclosed, TV 220 downloads programming code to remote control device 100 over data link 150. The data interface 110 of remote control device 100 receives the program code and stores the code in memory 120. TV 220, in order to configure remote control 100 to be able to control TV 220, transmits an interface control signal to remote control device 100 over data link 150. As was previously discussed, this interface control signal contains information that uniquely identifies the particular appliance such that the appropriate control software can be retrieved from memory 120 and utilized to configure user interface 140 to control that particular apparatus.

After receiving the interface control signal from TV 220, functions interface 130 accesses the control program from memory 120 to configure user interface 140. As illustrated in FIG. 2B, the software control program for TV 220 configures user interface 140 such that the same physical function control buttons that were previously configured to control the VCR of FIG. 2A are now configured to control TV 220. As such, function control button 146A is now configured to control the selection of channel "1" on the TV's channel selector. In a similar manner, button 146E could be configured to control the volume of the TV. As discussed previously, message display window 142 functions to provide information to the user related to the functions that each of the function control buttons control. In this embodiment, message 142A provides information that function control button 146A now controls the function of selecting channel 1 on the TV and message 142E provides information that button 146E controls the volume of the TV.

In this manner, the same physical function control buttons can be configured to control the functions of different appliances by utilizing the control program associated with each particular appliance. As such, the remote control device can be configured to control different appliances by utilizing programming software downloaded to the remote control device and accessed by utilizing an interface control signal received from the appliance to be controlled.

Figure 3B:
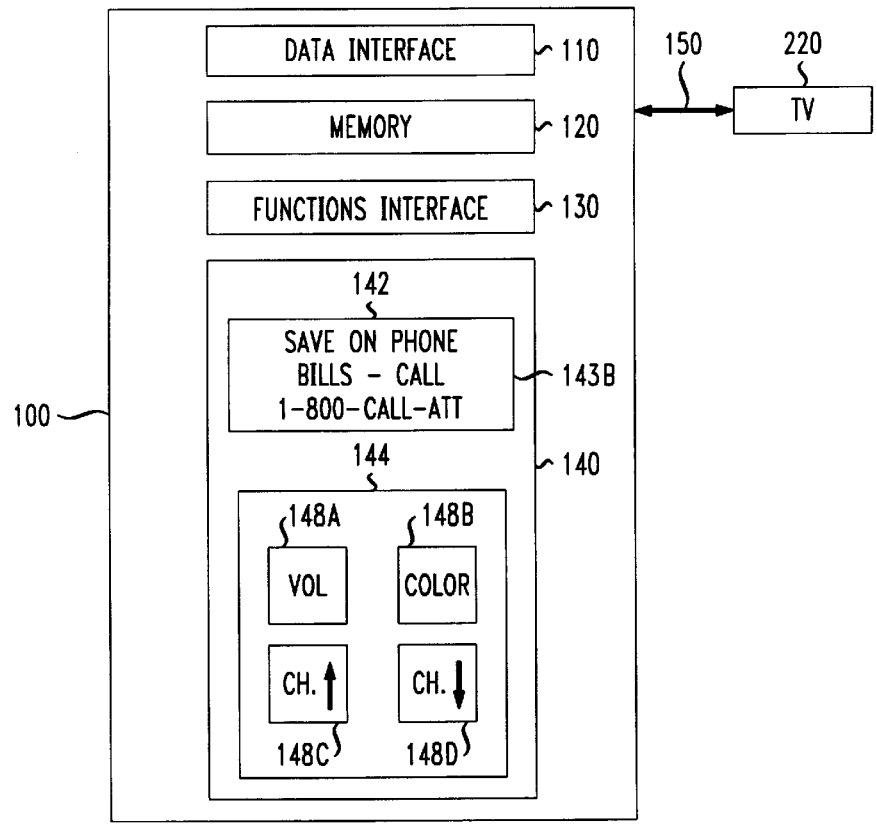
FIG. 3B illustrates the second embodiment for the user interface of FIG. 3A as used with a television.

FIGS. 2A and 2B illustrate user interface 140 as embodied with function control buttons that can be reconfigured to control various appliances. However, physical, structural buttons are not required. For example, as illustrated in FIGS. 3A and 3B, the function control panel 144 of user interface 140 could utilize an LCD touch screen display and function control icons rather than physical buttons. As embodied with an LCD display and icons, FIG. 3A illustrates user interface 144 as it would be configured to control VCR 200. The previous disclosure related to downloading programming code, receiving an interface control signal, and utilizing the interface control signal and programming code to configure the remote control device, applies to any contemplated embodiment for user interface 140.

As illustrated in FIG. 3A, user interface 144 has been configured to control VCR 200. As such, function control icons 147A–D are shown. The function control icons are generated and displayed by the control program software for the particular apparatus to be controlled. As shown, icon 147A controls the "play" function, 147B the "rewind" function, 147C the "stop" function, and 147D the "fast forward" function. The function control icons are presented on a touch screen such that by touching a particular icon, the user can send a function control signal to the VCR to control the particular function represented by the icon as previously disclosed. Additional icons can be displayed, as required, based on the number of functions associated with the particular appliance to be controlled.

In the embodiment of FIG. 3A, message display window 142, as previously disclosed, can be utilized to provide information to the user related to the VCR. Whereas a description for the functions of the various icons, as was disclosed for the embodiments of FIGS. 2A and 2B, may not be desired due to the graphical nature of the icons, the window can still be utilized to indicate, for example, that the remote control is currently configured to control the VCR, as indicated by message 143A. Any variety of messages can be provided in message window 142 and the present invention is not limited to providing any particular type of functional or informational message.

The embodiment of FIG. 3B illustrates the same embodiment for user interface 140 as was disclosed in FIG. 3A, however, the user interface of FIG. 3B has been configured to control TV 220 rather than VCR 200. As such, appropriate icons are generated and displayed on function control panel 144 to control TV 220. As illustrated in FIG. 3B, several icons that could be appropriate for controlling a TV would be icon 148A to control the volume of the TV, icon 148B to control the color quality of the TV picture, icon 148C to select increasing channel numbers, and icon 148D to select decreasing channel numbers.

As was stated previously, message display window 142 can be utilized to provide information to the user related to the particular appliance to be controlled. In providing information to the user, the display window's information and format is determined by the stored program code for the particular appliance that is downloaded to the remote control and stored in memory. However, additionally, as illustrated in FIG. 3B, message display window 142 can be utilized to provide information other than functional information to the user. For example, in FIG. 3B, an advertising message 143B is displayed in message window 142. The particular advertising message 143B displayed is "Save on Phone Bills— Call 1-800-Call-ATT". This particular message may be stored in memory 120 as part of the downloaded control program software for a particular appliance that is accessed when the remote control is configured to control that particular appliance, or the message can be transmitted by the appliance over data link 150 for receipt by the data interface 110 and, ultimately, by functions interface 130 for display on user interface 140. As such, non-stored messages may be displayed on message display window 142 of user interface 140.

Figure 4:
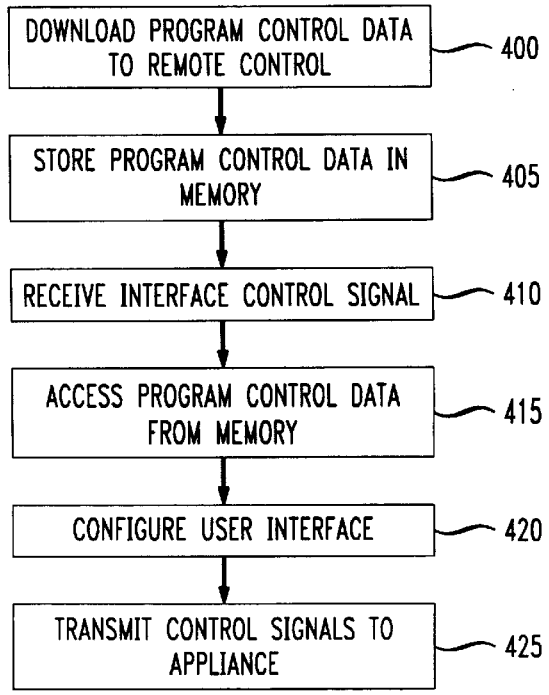
FIG. 4 provides a process flow chart for configuring the remote control device of the present invention.

In operation, the remote control device of the present invention operates as described in the process flow chart of FIG. 4. Step 400 represents the process of downloading programming code utilized to control a particular appliance to the remote control device by transmitting the code over a bi-directional data link. As disclosed, the program code is received by the data interface of the remote control device. Step 405 illustrates the step of storing the programming code in the memory of the remote control device. Step 410 is the step where the remote control device receives an interface control signal. In the disclosed embodiments, the interface control signal is transmitted over the bi-directional data link by the particular appliance to be controlled. Step 415 is the process where the stored programming code is accessed from the memory of the remote control device by utilizing the received interface control signal. Step 420 represents the step of configuring the user interface such that it is configured to control the particular appliance that is to be controlled. Step 425 is the step of transmitting control signals to the appliance by utilizing the user interface of the remote control device in order to control the appliance.

Several variations on the disclosed embodiments are contemplated. In the disclosed embodiments, the appliance itself downloads the programming code to the remote control device to control the appliance, however, it is not required that the appliance itself download the code. The feature of the invention where the remote control device can be configured to control a particular appliance after manufacture of the remote control does not require that the appliance itself downloads the code. The code can be downloaded to the remote control device from a source other than the appliance. For example, FIGS. 5 and 6 illustrate two alternative methods for downloading the programming code to the remote control device.

Figure 5:
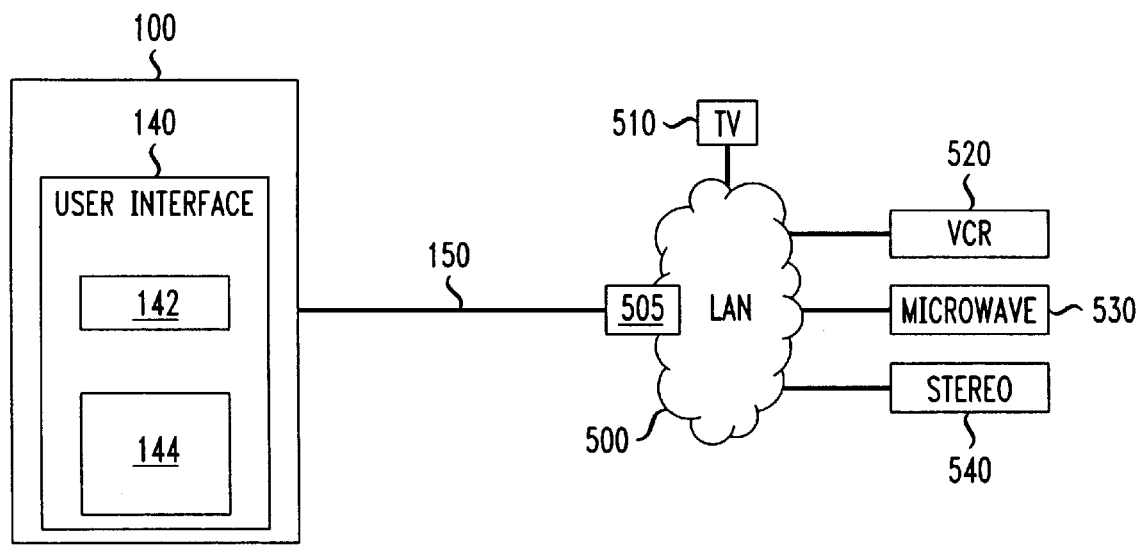
FIG. 5 illustrates the remote control device of the present invention as used with a local area network that interconnects several appliances.
Figure 6:
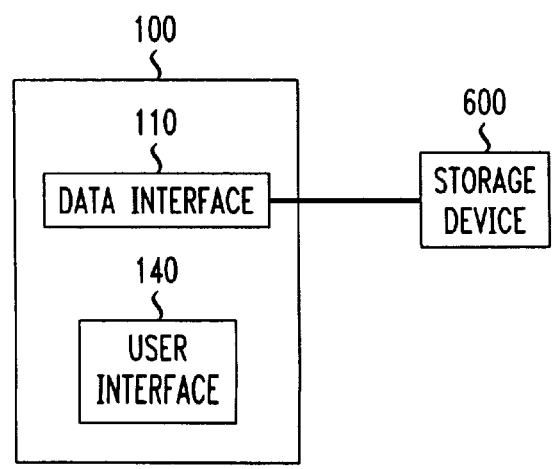
FIG. 6 illustrates an alternate embodiment for downloading programming software code to the remote control device that utilizes a storage device independent of the apparatus to be controlled.

FIG. 5 illustrates that all of the appliances in a home, for example, could be integrated into a local area network (LAN) 500, such as in a "smart home"-type of application. In the LAN application, the network transmitter/receiver 505 could be utilized to download the programming code for each appliance, e.g. TV 510, VCR 520, microwave 530, and stereo 540, to remote control device 100. The programming code could be loaded onto the network for each appliance and then be downloaded by the network to the remote control device.

Additionally, in the LAN application, the remote control would communicate with the network to control the appliance rather than with the appliances themselves. This LAN application could alleviate the requirement for each appliance to have its own transmitter and receiver and would allow the remote control device to activate a particular appliance that is out of direct line of sight with the remote control. Because a remote control that utilizes an infrared data link, for example, to control a particular appliance is not able to control the appliance if the remote control and appliance do not have an uninterrupted transmission path for the infrared data link, a network receiver located in a room separate from the appliance would be able to receive a signal transmitted from the remote control device to control a function of the appliance and transmit the signal over the network for receipt by the particular appliance. In this manner, an appliance, e.g. a stereo, could be turned on in a room separate from the room where the remote control device is located.

In the network application described above, and for any application where multiple appliances to be controlled are located in the same room, the remote control device could receive an interface control signal for each of the appliances on the network or in the room. The software could provide for a separate icon to be displayed in message display window 142 for each appliance that is available to be controlled. In order to control a particular appliance with the remote control device, the user would select the icon that represents the particular appliance. The selection of the icon would provide a control signal to the functions interface and the functions interface would then access the control software for that appliance from memory and configure the user interface function control panel so that it would be configured to control the appliance selected.

In the network application addressed above, the network could also transmit advertising information to the remote control for display on message display window 142 as described previously in this specification.

FIG. 6 shows another alternative embodiment for downloading programming code to the remote control device for controlling a particular appliance. FIG. 6 illustrates that a storage device 600 could be utilized to download programming code to the remote control 100. For example, storage device 600 could be a magnetic storage medium, e.g. a computer disk, that could be inserted into data interface 110. In this embodiment, data interface 110 would be configured to be able to receive the disk and download the programming code from the disk to the remote control. This configuration for data interface 110 would be similar to a computer disk drive. In this manner, the programming code would not need to be downloaded to the remote control by the appliance itself, but would rather be downloaded by utilizing a medium separate from the appliance.

Other alternatives for storage device 600 could be utilized as well. For example, an optical disk, rather than a magnetic disk, could be used to download the programming code to the remote control device.

As discussed, it is not required that the appliance itself that is to be controlled download the programming software code to the remote control device. The code can be downloaded to the remote control device in a variety of ways. If the appliance does not download the programming code to the remote control device, in operation, the appliance would transmit the interface control signal to the remote control device to identify itself and to allow the functions interface to search the memory of the remote control device to retrieve the programming code for the appliance and configure the user interface in order to control that particular appliance. In the situation where the programming code has not been previously downloaded to the remote control device, the remote control device will automatically attempt to find the programming code in one of the many download mechanisms (starting with the appliance itself) and request that the programming code for that particular appliance identifier be downloaded to the remote control device. Therefore, user intervention is only required if the downloading step has failed. In this manner, the first process step in utilizing the remote control device with a particular appliance is not required to be the downloading of the programming code to the remote control device. The appliance can first identify itself to the remote control device through the interface control signal. If the programming code has been previously downloaded to the remote control device, the remote control device will access the programming code and configure the user interface as previously discussed. If the programming code has not been previously stored in the remote control device's memory, the remote control device will automatically attempt to find the programming code in one of the many download mechanisms (starting with the appliance itself) and request that the programming code for that particular appliance identifier be downloaded to the remote control device.

Additionally, it is not required that the interface control signal be transmitted by the particular appliance to be controlled. The interface control signal can be input by the user of the remote control device. A separate input key could be provided that would allow the user to select an appliance to be controlled. Selection of the appliance by the user would transmit the interface control signal for that appliance to the functions interface which would allow the functions interface to access the programming code for that appliance from the memory and utilize the code for configuring the user interface. A code for each appliance for which programming code is stored in the remote control could be provided. When the user inputs the code for a particular appliance by utilizing the input key as disclosed above, the proper interface control signal would be generated for accessing the programming code for that appliance. In this manner, the interface control signal could be input by the user and is not required to be transmitted by the appliance itself.

Whereas the user interface is disclosed as including a message display window and a function control panel, where the function control panel can include function control buttons and function control icons, various other embodiments for the user interface could be utilized with the present invention. For example, a separate message display window and function control panel is not required. The functionality of these components can be combined into one component. All that is required is that the user interface be configurable to control the particular appliance to be controlled.

An additional feature of the present invention is that the user interface can be customized to reflect the use habits of the user. This can be accomplished by either the user or by the functions interface. For example, when utilizing the remote control to control a VCR, if the user most frequently utilizes the play and stop controls, these two function control icons could appear in the function control panel. The other function control icons, e.g. fast forward, would not be visible unless requested by the user. The user could scroll the function control panel to view and select the other function control icons, but because they are not utilized that often, they would not be presented in the function control panel. The user could program the functions interface to reflect their desired user interface configuration. Alternatively, the functions interface could customize the user interface by utilizing software to monitor the usage patterns of the user and utilizing these usage patterns to configure the user interface. In this manner, the user could customize the remote control based on their usage patterns and the remote control could "learn" from the user's usage patterns and utilize this information to appropriately configure the user interface.

As disclosed, a configurable remote control device is provided. The remote control is able to be programmed after initial manufacture to accommodate the control of additional apparatuses. The remote control device includes a multi-functional, interchangeable user interface where the interface is modified such that it is able to control the functions of a variety of different types of apparatuses.

What is claimed is:

1. A remote control device for controlling one or more functions of a plurality of appliances, comprising:

a data interface, wherein said data interface downloads a plurality of programming software codes wherein each of said plurality of programming software codes is received from a different one of the plurality of appliances, each of said plurality of programming software codes only containing code required to operate the one or more functions of a respective one of the plurality of appliances;

a single memory module coupled to the data interface wherein said single memory module stores each of said plurality of programming software codes received from each of the plurality of appliances;

a user interface; and a functions interface, wherein said functions interface receives an interface control signal from one of the plurality of appliances and utilizes said interface control signal received from the one of the plurality of appliances to access a respective one of said plurality of programming software codes associated with the one of the plurality of appliances from said single memory module and wherein said accessed programming software code configures said user interface to provide for the control of the one or more functions of the one of the plurality of appliances;

and wherein said user interface is customized to reflect use habits of a user of said remote control device by monitoring, by said remote control device said use habits of the user of said remote control device.

2. The remote control device of claim 1 wherein each of said plurality of programming software codes is received by said data interface through an infrared data link.

3. The remote control device of claim 1 wherein said user interface is an LCD display.

4. The remote control device of claim 3 wherein said LCD display includes function control icons.

5. The remote control device of claim 3 wherein said LCD display includes a message display window.

6. The remote control device of claim 1 wherein said user interface includes function control buttons.

7. The remote control device of claim 6 wherein said user interface further includes an LCD display having a message display window and wherein said message display window is scrollable by a user to display information related to all functions performed by said function control buttons.

8. The remote control device of claim 1 further comprising a local area network having a network interface wherein each of the plurality of appliances is connected to said local area network and wherein each of said plurality of programming software codes is received from a respective one of the plurality of appliances at said remote control device though said network interface.

9. A method for configuring a remote control device for controlling one or more functions of a plurality of appliances, comprising the steps of:

downloading a plurality of programming software codes to said remote control device, wherein each of said plurality of programming software codes is received by said remote control device from a different one of the plurality of appliances, each of said plurality of programming software codes only containing code required to operate the one or more functions of a respective one of the plurality of appliances;

storing each of said plurality of programming software codes in a single memory module;

receiving an interface control signal at said remote control device from one of the plurality of appliances;

accessing a respective one of said plurality of programming software codes from said single memory module associated with the one of the plurality of appliances by utilizing said interface control signal received from the one of the plurality of appliances;

configuring a user interface by said respective one of said accessed plurality of programming software codes for controlling the one or more functions of the one of the plurality of appliances;

monitoring by said remote control device, use habits of said remote control device by a user of said remote control device; and customizing said user interface of said remote control device to reflect said monitored use habits of the user.

10. The method of claim 9 wherein each of said plurality of programming software codes is received through an infrared data link.

11. The method of claim 9 wherein said user interface is an LCD display.

12. The method of claim 9 wherein the step of customizing said user interface of said remote control device to reflect said monitored use habits of the user includes the steps of:

displaying in a function control panel a first icon representative of a frequently used function by the user; and not displaying in said function control panel a second icon representative of an infrequently used function by the user.

13. The method of claim 12 further comprising the step of scrolling said second icon on said function control panel such that said second icon is displayed on said function control panel by the user of said remote control device.

14. A method for configuring a remote control device for controlling one or more functions of a plurality of appliances, comprising the steps of:

transmitting an interface control signal to said remote control device from one of the plurality of appliances to be controlled, said interface control signal identifying the one of the plurality of appliances to be controlled to said remote control device;

searching a memory of said remote control device by a functions interface to determine if a programming software code for the one of the plurality of appliances to be controlled is stored in said memory, said programming software code utilized to configure a user interface of said remote control device in order to control the one or more functions of the one of the plurality of appliances; and if said programming software code for the one of the plurality of appliances to be controlled is not stored in said memory:

automatically attempting by said remote control device to find said programming software code for the one of the plurality of appliances to be controlled in one of a plurality of download apparatuses; and if said programming software code for the one of the plurality of appliances to be controlled is found in one of the plurality of download apparatuses:

requesting by said remote control device that said programming software code for the one of the plurality of appliances to be controlled be downloaded from the one of the plurality of download apparatuses to said remote control device; and if said programming software code for the one of the plurality of appliances to be controlled is stored in said memory:

accessing said programming software code from said memory for the one of the plurality of appliances to be controlled; and configuring said user interface in order to control the one or more functions of the one of the plurality of appliances.

15. The method of claim 14 further comprising the steps of:

monitoring, by said remote control device, use habits of said remote control device by a user of said remote control device; and customizing said user interface of said remote control device to reflect said monitored use habits of the user.

16. The method of claim 15 wherein the step of customizing said user interface of said remote control device to reflect said monitored use habits of the user includes the steps of:

displaying in a function control panel a first icon representative of a frequently used function by the user; and not displaying in said function control panel a second icon representative of an infrequently used function by the user.

17. The method of claim 16 further comprising the step of scrolling said second icon on said function control panel such that said second icon is displayed on said function control panel by the user of said remote control device.

18. The method of claim 14 wherein said interface control signal is transmitted to said remote control device through an infrared data link.

19. The method of claim 14 wherein said user interface is an LCD display.

20. The method of claim 19 wherein said LCD display includes a message display window.

21. The method of claim 14 wherein each of the plurality of appliances is connected to a local area network and wherein said interface control signal transmitted from the one of the plurality of appliances is transmitted over said local area network to said remote control device.

* * * * *